US009639731B2

(12) United States Patent
Barkan et al.

(10) Patent No.: US 9,639,731 B2
(45) Date of Patent: May 2, 2017

(54) COMPACT MIRROR ARRANGEMENT FOR AND METHOD OF CAPTURING LIGHT OVER MULTIPLE SUBFIELDS OF VIEW THROUGH AN UPRIGHT WINDOW OF A POINT-OF-TRANSACTION WORKSTATION

(71) Applicant: SYMBOL TECHNOLOGIES, LLC, Lincolnshire, IL (US)

(72) Inventors: Edward D. Barkan, Miller Place, NY (US); Mark E. Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/833,176

(22) Filed: Aug. 24, 2015

(65) Prior Publication Data
US 2017/0061180 A1  Mar. 2, 2017

(51) Int. Cl.
*G06K 7/10* (2006.01)
*G06K 7/14* (2006.01)

(52) U.S. Cl.
CPC ..... *G06K 7/10831* (2013.01); *G06K 7/10722* (2013.01); *G06K 7/10732* (2013.01)

(58) Field of Classification Search
CPC ............ G06K 7/1096; G06K 7/10722; G06K 7/1098; G06K 7/10732; G06K 7/10811; G06K 7/10861; G06K 7/10554; G06K 7/10683; G06K 7/10574; G06K 7/10633; G06K 7/10603; G06K 17/0022; G06K 2207/1012; G06K 2207/1013; G06K 7/10; G06K 7/10564; G06K 7/10584; H05K 1/141
See application file for complete search history.

(56) References Cited

U.S. PATENT DOCUMENTS

| 2013/0087617 | A1* | 4/2013 | Drzymala | ............ | G06K 7/1096 235/454 |
| 2013/0134220 | A1  | 5/2013 | Chen et al. | | |
| 2013/0175341 | A1* | 7/2013 | Kearney | .............. | G06K 7/1096 235/440 |

OTHER PUBLICATIONS

International Search Report and Written Opinion for corresponding International Patent Application No. PCT/US2016/046687 mailed on Oct. 24, 2016.

* cited by examiner

*Primary Examiner* — Thien T Mai

(57) ABSTRACT

A compact optical arrangement splits the field of view of an upwardly-looking imager into a plurality of intersecting subfields along which return light from a target passes through and past an upright window to the imager. A top mirror is positioned along a vertical axis directly above the imager. Overhead mirror portions located between the imager and the top mirror are spaced radially apart to enable the return light reflected by the top mirror to bypass the overhead mirror portions and pass unobstructedly directly to the imager along a central subfield. A plurality of side fold mirrors reflects the return light passing through the upright window to the overhead mirror portions. The overhead mirror portions are positioned apart to enable the return light reflected by the side fold mirrors to pass to the imager along a pair of outer subfields.

12 Claims, 6 Drawing Sheets

COMPACT MIRROR ARRANGEMENT FOR AND METHOD OF CAPTURING LIGHT OVER MULTIPLE SUBFIELDS OF VIEW THROUGH AN UPRIGHT WINDOW OF A POINT-OF-TRANSACTION WORKSTATION

BACKGROUND OF THE INVENTION

The present disclosure relates generally to a compact mirror arrangement for, and a method of, capturing return light from a target, such as a bar code symbol, over multiple subfields of view through an upright window of a point-of-transaction workstation, especially a dual window, bioptical workstation.

It is known to use solid-state imagers in single or dual window, point-of-transaction workstations to electro-optically read, by image capture, symbol targets, such as one- or two-dimensional bar code symbols, and/or to image document targets, such as receipts, prescriptions, driver's licenses, etc., the targets being associated with products to be identified and processed, e.g., purchased, at the workstation provided at a countertop of a checkout stand in supermarkets, warehouse clubs, department stores, and other kinds of retailers. The products are typically slid or moved by a user across, or presented to and momentarily held steady at a central region of, a generally horizontal window that is mounted in a horizontal platform and that faces upwardly above the countertop, and/or a generally vertical or upright window that is mounted in a raised vertical tower and that faces the user. The known workstations utilize multiple mirror arrangements to direct return light from the products to one or more imagers along multiple, intersecting fields of view, or subfields, that pass through the windows along different directions in order to provide a full coverage scan zone that extends above the horizontal window and in front of the upright window as close as possible to the countertop, and extends sufficiently high above the countertop, and extends as wide as possible across the width of the countertop, to enable reliable reading of a target that could be positioned anywhere on all six sides of a three-dimensional product. The scan zone projects into space away from the windows and grows in volume rapidly in order to cover targets on products that are positioned not only on the windows, but also at working distances therefrom.

As advantageous as the known workstations have been, their mirror arrangements, especially those associated with their upright windows, are costly and occupy a relatively large volume of space and cause their vertical towers to be correspondingly large in depth, bulky, and unwieldy. In some cramped retail venues, a bulky tower will not readily fit on a narrow countertop. A bulky tower also forces the upright window to be positioned too close to the user, thereby limiting the volume through which the products can pass through the workstation. In some applications, the horizontal platform also serves as a weighing platter, and a bulky tower that occupies a substantial area on the countertop will constrain the size of the weighing platter.

Accordingly, it would be desirable to configure the mirror arrangements associated with the upright windows to be more compact in volume and to be less expensive in cost, to configure the vertical towers to take up less space, to enable workstations with upright windows to be less unwieldy and to more readily fit into cramped venues, and to more fully optimize the space available in front of the upright windows in such workstations, all without sacrificing the size of the full coverage scan zones and the performance of the workstations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 2:
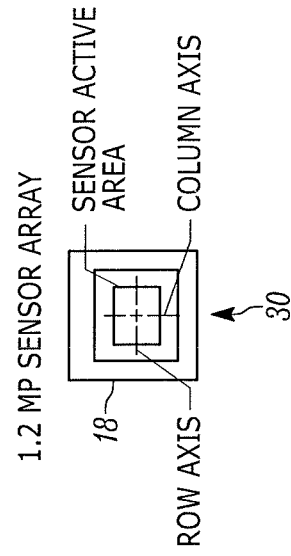
FIG. 2 is a top plan view of a sensor array of an imager for use in the workstation of FIG. 1.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an apparatus for imaging targets, such as symbol targets and/or document targets. The apparatus includes a housing, an upright window supported by the housing, a solid-state imager supported by the housing and having an array of image sensors with a field of view looking upwardly along a vertical axis, and a compact optical arrangement supported by the housing and operative for splitting the field of view of the imager into a plurality of intersecting subfields of view along which return light from a target to be imaged passes through and past the upright window to the imager.

The optical arrangement includes a top mirror positioned along the axis directly above the imager. The top mirror faces the upright window to reflect the return light passing through the upright window to the imager. The optical arrangement also includes a pair of overhead mirror portions positioned along the axis between the imager and the top mirror. The overhead mirror portions are spaced radially apart to enable the return light reflected by the top mirror to bypass the overhead mirror portions and pass unobstructedly directly to the imager along a central subfield of the field of view of the imager. The optical arrangement further includes a plurality of side fold mirrors spaced away from the axis and operative for reflecting the return light passing through the upright window to the overhead mirror portions. The overhead mirror portions are positioned apart to enable the return light reflected by the side fold mirrors to pass to the imager along a pair of outer subfields of the field of view of the imager. The central subfield is located between the outer subfields. In a preferred embodiment, the housing is a point-of-transaction workstation, especially a dual window, bioptical workstation, for processing products by electro-optically imaging targets associated with the products.

Another aspect of this disclosure relates to a method of imaging targets. The method is performed by mounting an upright window on a housing, supporting in the housing a solid-state imager having an array of image sensors with a field of view looking upwardly along a vertical axis, and splitting the field of view of the imager into a plurality of intersecting subfields of view along which return light from a target to be imaged passes through and past the upright window to the imager. The splitting is performed by positioning a top mirror along the axis directly above the imager, and facing the upright window to reflect the return light passing through the upright window to the imager, by positioning a pair of overhead mirror portions along the axis between the imager and the top mirror, by spacing the overhead mirror portions radially apart to enable the return light reflected by the top mirror to bypass the overhead mirror portions and pass unobstructedly directly to the imager along a central subfield of the field of view of the imager, by spacing a plurality of side fold mirrors away from the axis, and reflecting the return light passing through the upright window to the overhead mirror portions, by positioning the overhead mirror portions apart to enable the return light reflected by the side fold mirrors to pass to the imager along a pair of outer subfields of the field of view of the imager, and by locating the central subfield between the outer subfields.

Figure 1:
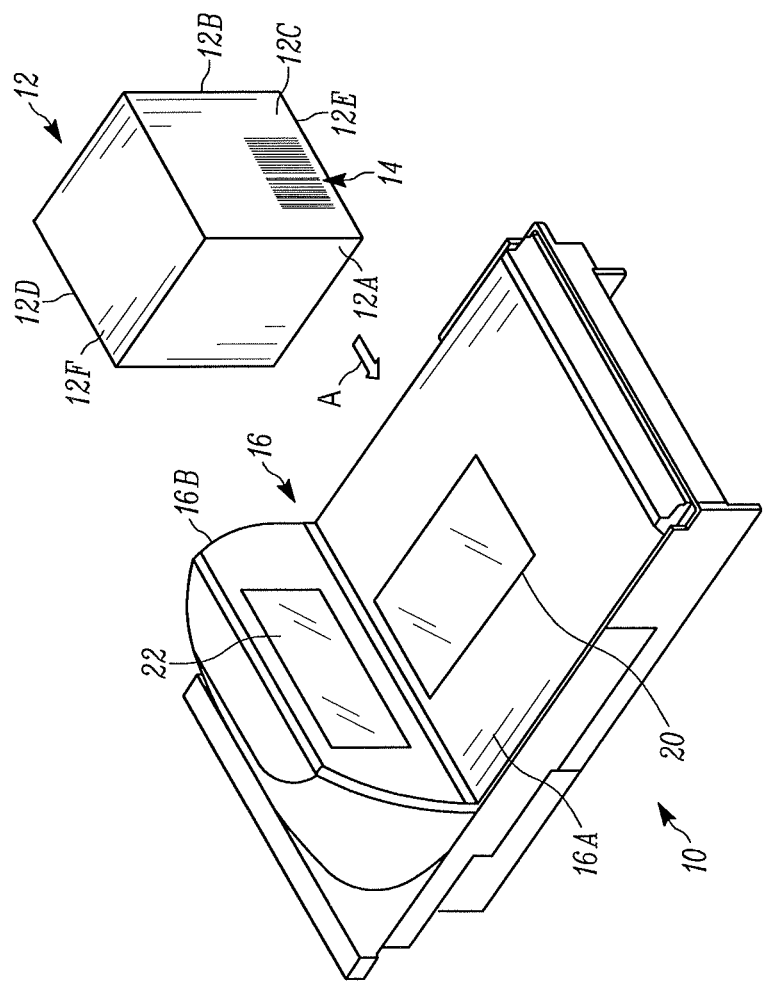
FIG. 1 is a perspective view of a dual window, bioptical, point-of-transaction workstation operative for reading a target on a multi-sided product passing through the workstation by image capture.

Turning now to the drawings, FIG. 1 depicts a dual window, bioptical, point-of-transaction workstation 10 for electro-optically imaging targets 14, such as a one-dimensional, Universal Product Code (UPC) symbol, associated with multi-sided, three-dimensional products 12, and is typically used by retailers to process transactions involving the purchase of the products 12 bearing, or printed or associated with, the identifying target 14. The workstation 10 includes a housing 16 haying a generally horizontal window 20 located in a generally horizontal plane and supported by a horizontal housing portion or platform 16A, and an upright window 22 located in a generally upright plane that intersects the generally horizontal plane and supported by a raised housing portion or vertical tower 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 typically measures about four inches in width by about six inches in length, while the generally upright window 22 measures about seven inches in width by about four inches in length. The products are passed by an operator or a customer through a scan zone, which occupies the space at and above the horizontal window 20, and also occupies the space at and in front of the upright window 22.

The target 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The target 14 could also be a non-symbol target, such as a personal check, a credit card, a debit card, a prescription, a driver's license, the consumer himself or herself, or the operator himself or herself Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes.

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. The product 12 can be tilted or moved in other directions through the workstation 10.

Figure 3:
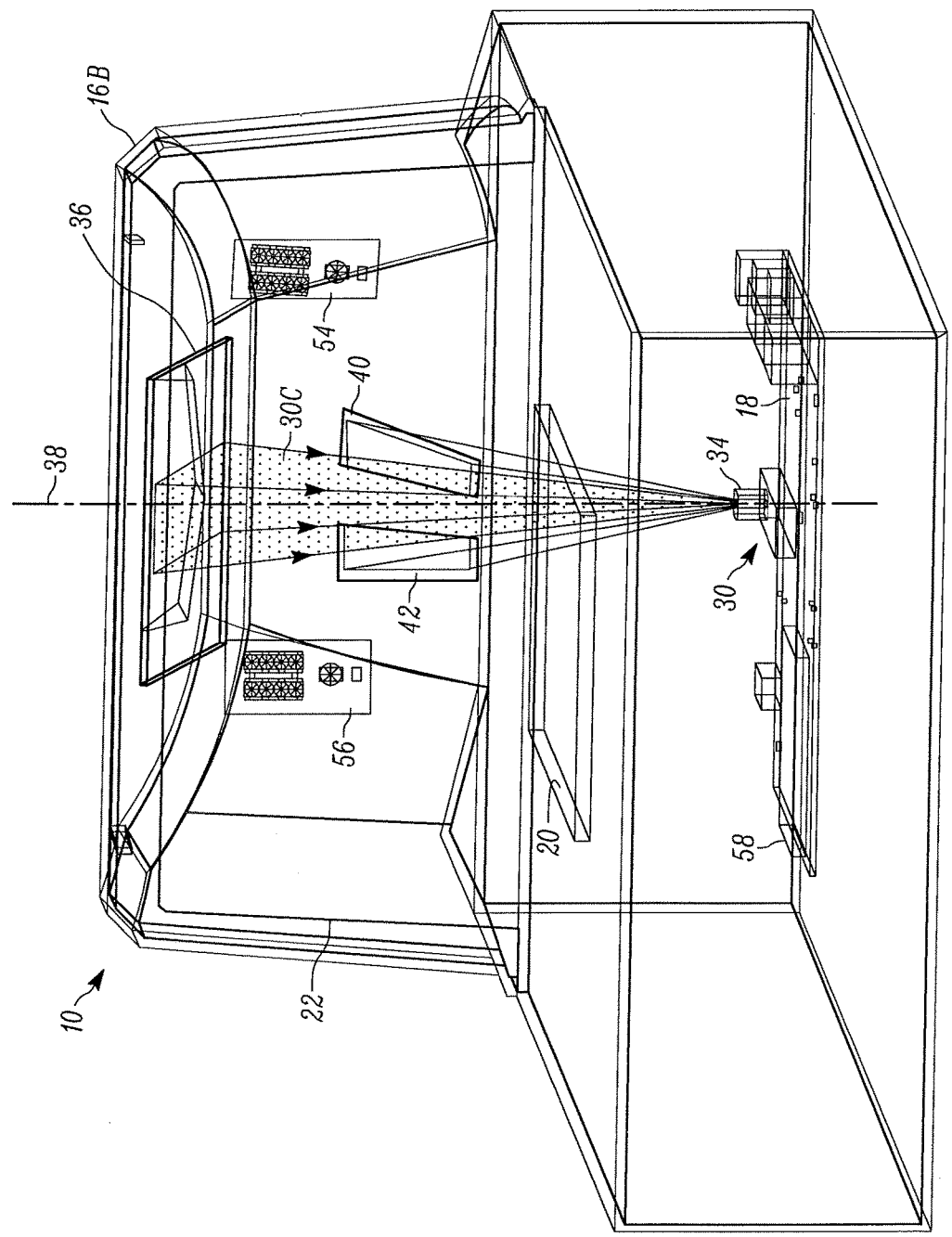
FIG. 3 is an enlarged, perspective view of part of a compact optical arrangement in the workstation of FIG. 1 diagrammatically depicting a trailing part of a folded optical path of a central subfield of view of the imager of FIG. 2.

As best shown in FIG. 3, a solid-state imager 30 is supported on a printed circuit board 18 within the housing 16. The imager 30 has a sensor array of image sensors with a field of view diagrammatically shown by speckles in the various views. The imager 30 preferably comprises a two-dimensional, charge coupled device (CCD) array, or a complementary metal oxide semiconductor (CMOS) array, of image sensors of megapixel size, e.g., 1280 pixels wide× 960 pixels high. In a preferred embodiment, the field of view of the imager 30 measures about 15 degrees by 30 degrees. The array of the imager 30 extends along mutually perpendicular, row and column, directions. Thus, as shown in FIG. 2, the imager 30 has a row axis and a column axis. The imager 30 includes an imaging lens assembly 34 for capturing return light from the target 14 and for projecting the captured return light onto the sensor array.

In accordance with this disclosure, a compact optical arrangement is supported by the housing 16 and is operative, as described in detail below, for splitting the field of view of the imager 30 into a plurality of intersecting subfields of view, namely a central subfield 30C flanked by two outer, right and left, subfields 30R, 30L, along which return light from a target 14 to be imaged passes through and past the upright window 22 to the imager 30. These subfields are shown in the drawings with speckles. As described below, this optical arrangement associated with the upright window 22 is configured to be more compact in volume and to be less expensive in cost as compared to the known optical arrangements. Also, this optical arrangement enables the vertical tower 16B to take up less space, and enables the workstation 10 with the upright window 22 to be less unwieldy and to more readily fit into cramped venues, and more fully optimizes the space available in front of the upright window 22 in such a workstation 10, as compared to known optical arrangements and workstations, all without sacrificing the size of the scan zone of the workstation 10 and the performance of the workstation 10.

Figure 4:
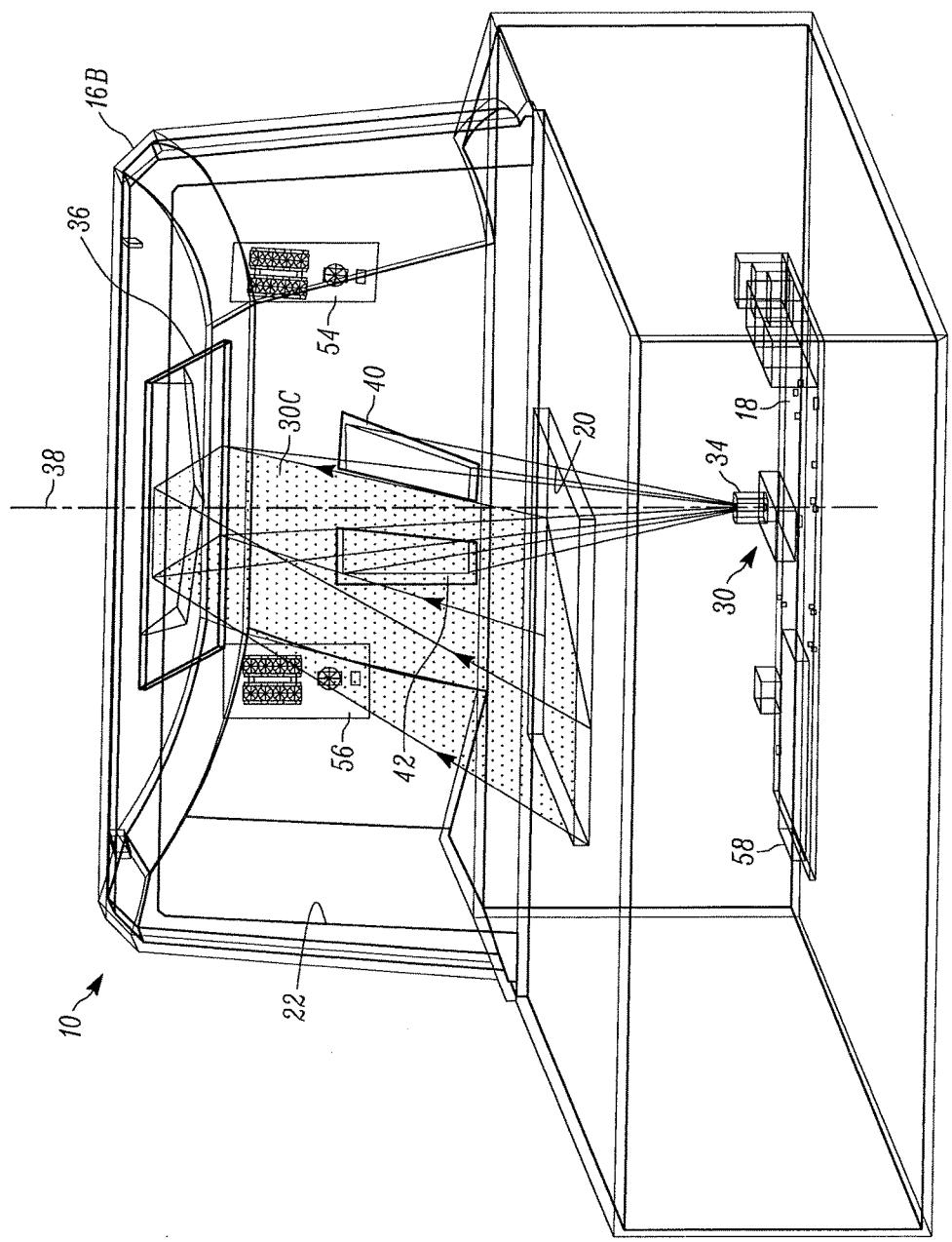
FIG. 4 is an enlarged, perspective view of the optical arrangement of FIG. 3 diagrammatically depicting a leading part of the folded optical path of the central subfield of view of the imager of FIG. 2 that passed through an upright window of the workstation.
Figure 5:
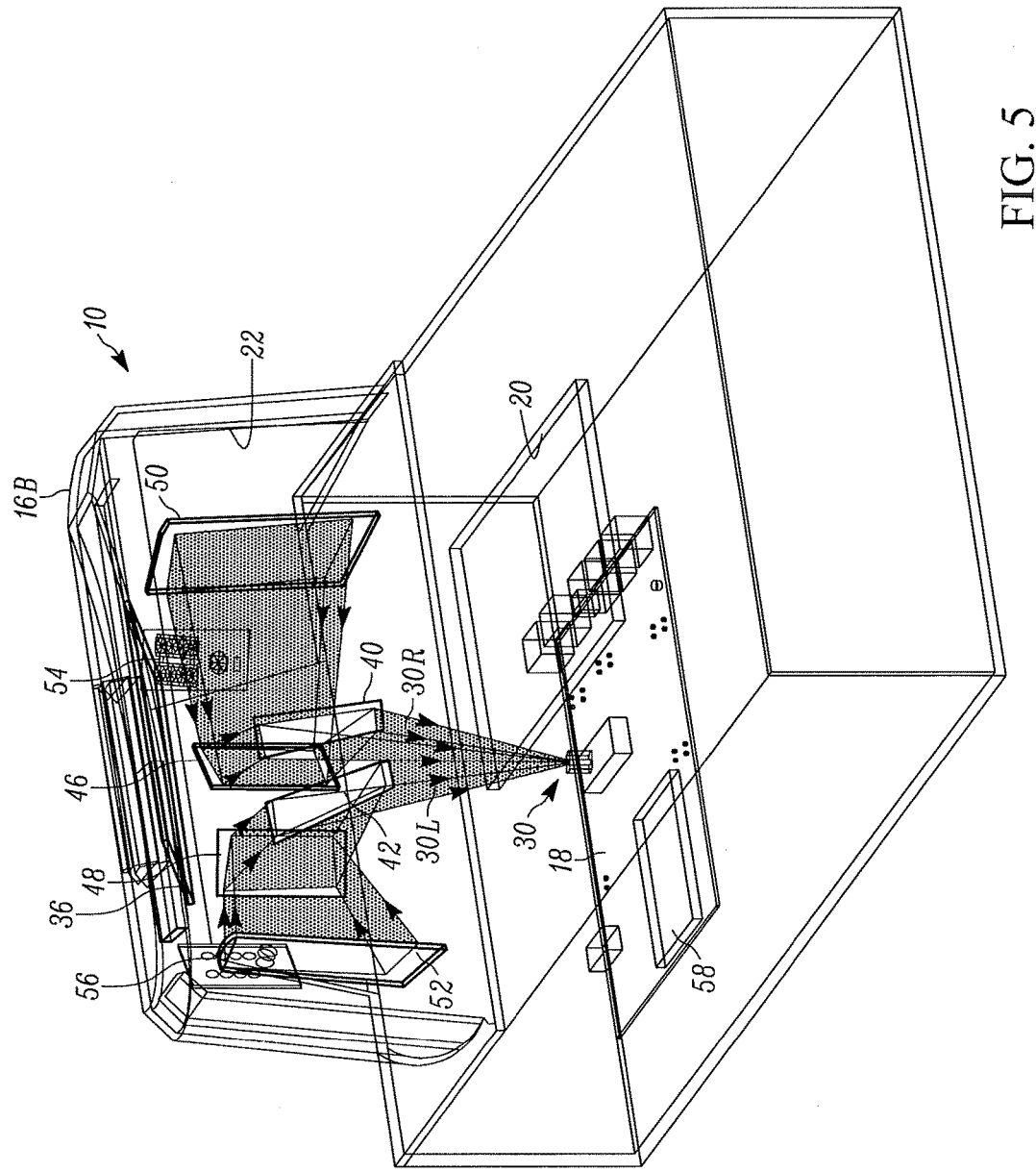
FIG. 5 is an enlarged, perspective view of another part of the optical arrangement in the workstation of FIG. 1 diagrammatically depicting trailing parts of a folded optical path of a pair of outer subfields of view of the imager of FIG. 2.

More particularly, as best seen in FIGS. 3-4, the optical arrangement includes a top mirror 36 positioned along a vertical axis 38 directly above the imager 30. The imager 30 is looking upwardly along the axis 38 in a direction perpendicular to the plane of the board 18. The top mirror 36 is a generally planar fold mirror, and is tilted to face not only the imager 30 (see FIG. 3), but also to face the upright window 22 to reflect the return light passing through the upright window 22 to the imager 30. It will be noted from FIGS. 3-4, that the optical path between the top mirror 36 and the imager 30 is essentially vertical, and that there is no part of the optical path between the top mirror 36 and the imager 30 that is directed in a direction perpendicular to the upright window. This enables the vertical tower 16B to be shallower in depth and to be less bulky and large as compared to known optical arrangements.

The optical arrangement also includes a pair of overhead mirror portions 40, 42 positioned along the axis 38 between the imager 30 and the top mirror 36. The overhead mirror portions 40, 42 are spaced radially apart to enable the return light reflected by the top mirror 36 to bypass the overhead mirror portions 40, 42 and pass unobstructedly directly to the imager 30 along the central subfield 30C of the field of view of the imager 30. As illustrated, the overhead mirror portions 40, 42 are a pair of generally planar, fold mirrors. However, the overhead mirror portions 40, 42 can also be a single planar, fold mirror with a cutout through which the return light reflected by the top mirror 36 can pass unobstructedly directly to the imager 30 along the central subfield 30C.

Figure 6:
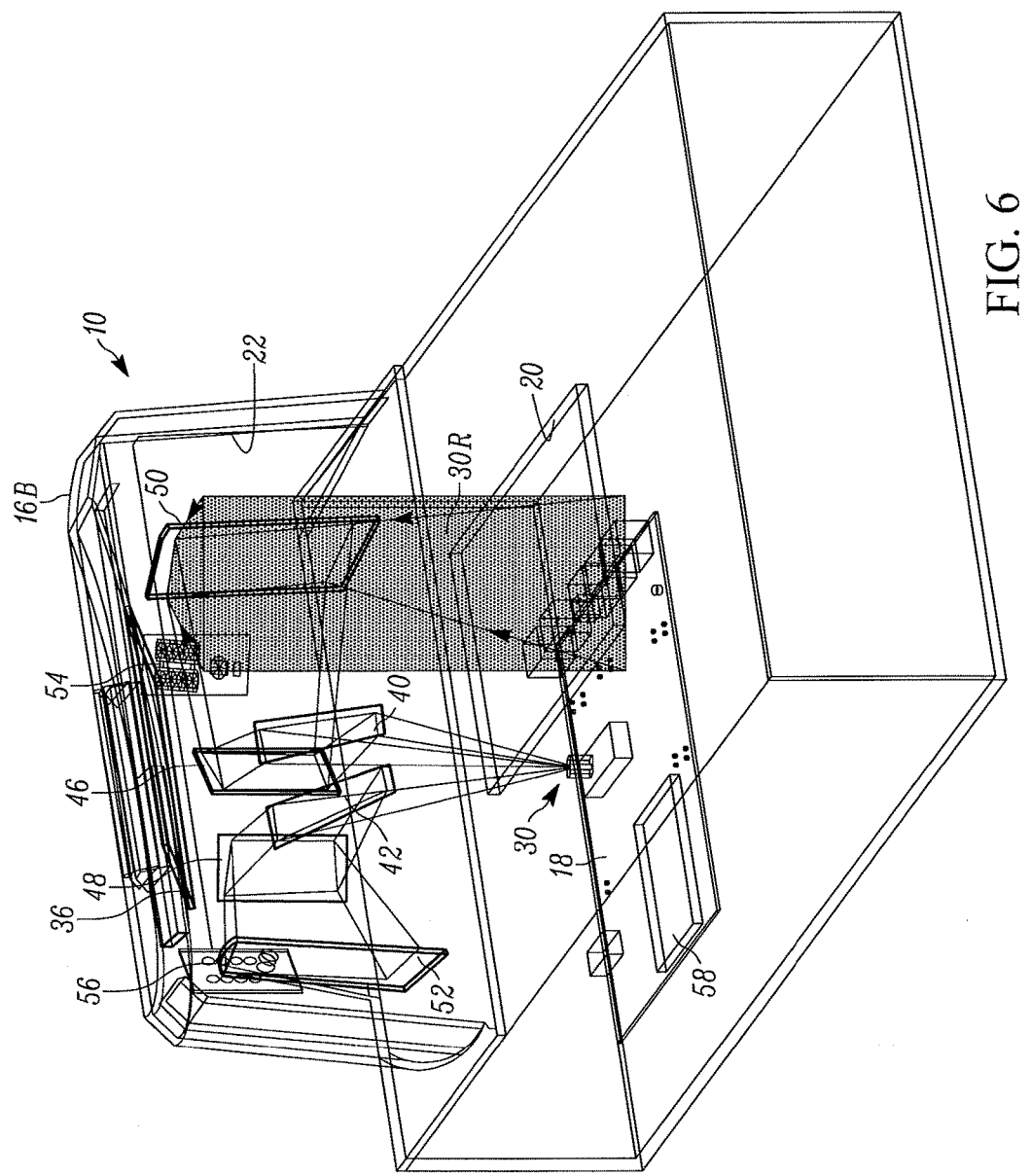
FIG. 6 is an enlarged, perspective view of the optical arrangement of FIG. 5 diagrammatically depicting a leading part of the folded optical path of one of the outer subfields of view of the imager of FIG. 2 that passed through the upright window.

The optical arrangement further includes a plurality of side fold mirrors 46, 48, 50, 52 spaced away from the axis 38 and operative for reflecting the return light passing through the upright window 22 to the overhead mirror portions 40, 42. Each of the side fold mirrors 46, 48, 50, 52 is a generally planar, fold mirror. The overhead mirror portions 40, 42 are positioned apart to enable the return light reflected by the side fold mirrors 46, 48, 50, 52 to pass to the imager 30 along the pair of outer subfields 30R, 30L of the field of view of the imager 30. Thus, as shown in FIG. 6, the return light in outer subfield 30R passes through the upright window 22 to the fold mirror 50, whereupon the light is reflected to the fold mirror 46, whereupon the light is reflected to the overhead mirror portion 40, whereupon the light is reflected to the imager 30 along the outer subfield 30R. Similarly, the return light in outer subfield 30L passes through the upright window 22 to the mirrors 52 and 48 in succession, whereupon the light is reflected to the overhead mirror portion 42, whereupon the light is reflected to the imager 30 along the outer subfield 30L.

Figure 7:
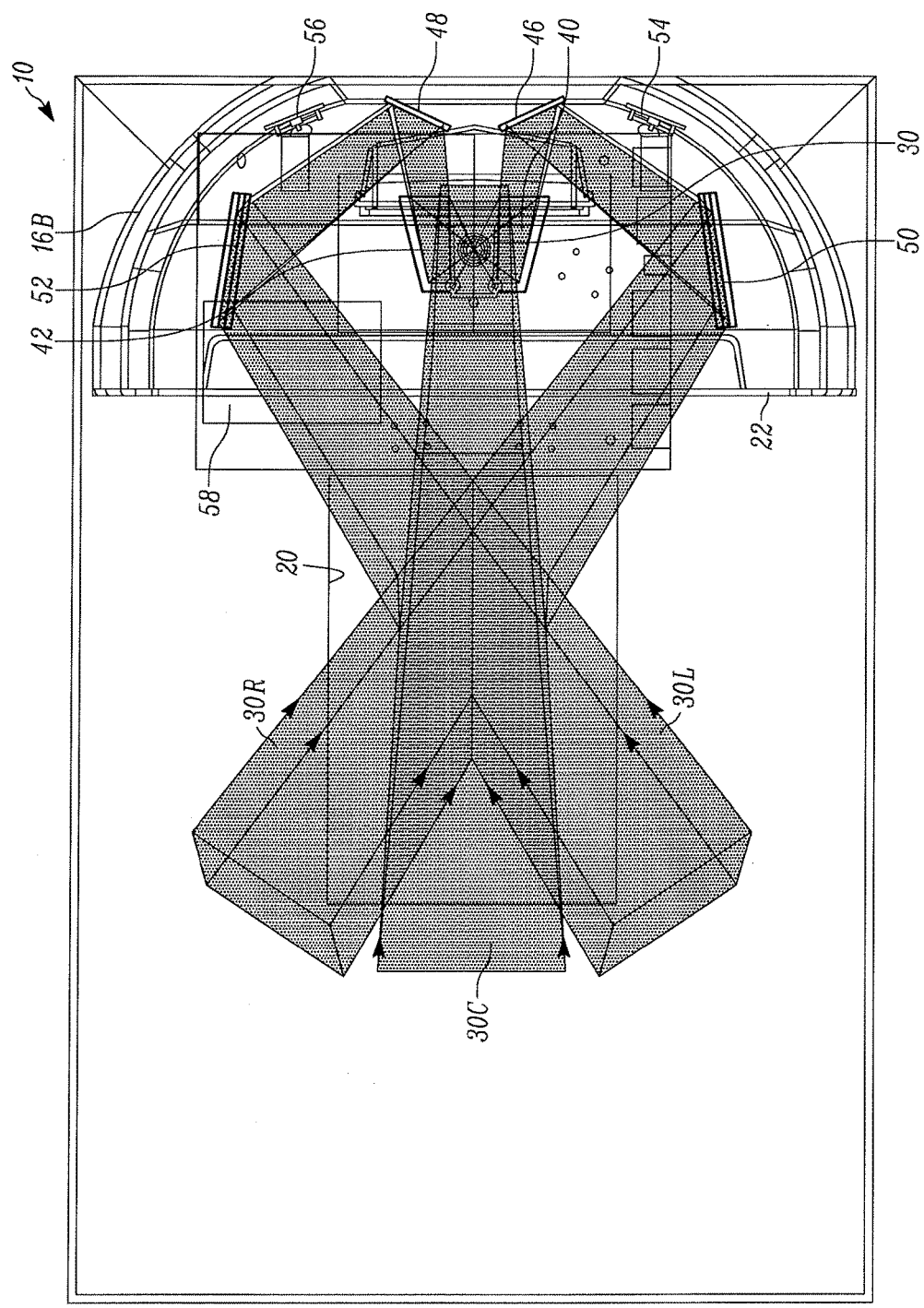
FIG. 7 is a top plan view of the optical arrangement diagrammatically depicting the three subfields of the imager of FIG. 2 that passed through the upright window of the workstation of FIG. 1.

As best seen in the top plan view of FIG. 7, the set of mirrors 40, 46, 50 and the set of mirrors 42, 48, 52 are symmetrically positioned relative to the axis 38. In addition, the set of mirrors 40, 46, 50 and the set of mirrors 42, 48, 52 are oriented relative to one another to reflect the return light along non-skewed, optical paths. In a preferred embodiment, each overhead mirror portion 40, 42 is oriented about 49.5 degrees relative to the horizontal; the fold mirrors 46, 48 are oriented about 22.5 degrees relative to the vertical; and the fold mirrors 50, 52 are oriented about 8.5 degrees relative to the vertical.

Also illustrated is a pair of illuminators 54, 56 for uniformly illuminating all the subfields of view in the scan zone. A controller 58 or programmed microprocessor is mounted on the board 18 and is operatively connected to the imager 30 and the illuminators 54, 56 for energizing the illuminators to illuminate the subfields of view, and for processing the captured illumination light in at least one of the subfields of view to read the target, and to decode the target if the target is a symbol. In use, a user, such as a person working at a supermarket checkout counter, or a customer in a self-checkout stand, processes the product 12 bearing the UPC symbol 14 thereon past the window 22 by swiping the product 12 across the window 22, or by presenting and momentarily holding the product 12 at the window 22. The symbol 14 may located on any of the top, bottom, right, left, front and rear, sides of the product 12, and the imager 30 will capture the illumination light reflected, scattered, or otherwise returning from the symbol 14 through the window 22. All three of the subfields 30C, 30R and 30L pass through the upright window 22 along different intersecting directions to read three sides of the product. As shown in FIG. 7, the three subfields substantially fully occupy the scan zone.

In the foregoing specification, specific embodiments have been described. However, one of ordinary skill in the art appreciates that various modifications and changes can be made without departing from the scope of the invention as set forth in the claims below. For example, the workstation need not be a dual window, bioptical workstation, but could be a single window workstation, such as a vertical slot scanner. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for imaging targets, comprising:
   a housing;
   an upright window supported by the housing;
   a solid-state imager supported by the housing and having an array of image sensors with a field of view looking upwardly along a vertical axis; and
   a compact optical arrangement supported by the housing and operative for splitting the field of view of the imager into a plurality of intersecting subfields of view along which return light from a target to be imaged passes through and past the upright window to the imager, the optical arrangement including:
      a top mirror positioned along the vertical axis directly above the imager, and facing the upright window to reflect the return light passing through the upright window to the imager,
      a pair of overhead mirror portions positioned along the vertical axis between the imager and the top mirror, the overhead mirror portions being spaced radially apart to enable the return light reflected by the top mirror to bypass the overhead mirror portions and pass unobstructedly directly to the imager along a central subfield of the field of view of the imager, and
      a plurality of side fold mirrors spaced away from the vertical axis and operative for reflecting the return light passing through the upright window to the overhead mirror portions, the overhead mirror portions being positioned apart to enable the return light reflected by the side fold mirrors to pass to the imager along a pair of outer subfields of the field of view of the imager, the central subfield being located between the outer subfields.

2. The apparatus of claim 1, wherein the overhead mirror portions are a pair of generally planar, fold mirrors.

3. The apparatus of claim 1, wherein the side fold mirrors include a pair of first side mirrors that face the overhead mirror portions, and a pair of second side mirrors that face the first side mirrors.

4. The apparatus of claim 1, wherein the overhead mirror portions and the side fold mirrors are symmetrically positioned relative to the vertical axis.

5. The apparatus of claim 1, wherein the overhead mirror portions and the side fold mirrors are oriented relative to one another to reflect the return light along non-skewed optical paths.

6. The apparatus of claim 1, and an illumination light source for illuminating each subfield of view.

7. A point-of-transaction workstation for processing products by electro-optically imaging targets associated with the products, the workstation comprising:
   a housing having one upright window located in an upright plane, and another window located in a generally horizontal plane that intersects the upright plane, the windows bounding an area in which each product is presented for processing;
   a solid-state imager supported by the housing and having an array of image sensors with a field of view looking upwardly along a vertical axis; and
   a compact optical arrangement supported by the housing and operative for splitting the field of view of the imager into a plurality of intersecting subfields of view along which return light from a target to be imaged passes through and past the upright window to the imager, the optical arrangement including:
      a top mirror positioned along the vertical axis directly above the imager, and facing the upright window to reflect the return light passing through the upright window to the imager,
      a pair of overhead mirror portions positioned along the vertical axis between the imager and the top mirror, the overhead mirror portions being spaced radially apart to enable the return light reflected by the top mirror to bypass the overhead mirror portions and pass unobstructedly directly to the imager along a central subfield of the field of view of the imager, and
      a plurality of side fold mirrors spaced away from the vertical axis and operative for reflecting the return light passing through the upright window to the overhead mirror portions, the overhead mirror portions being positioned apart to enable the return light reflected by the side fold mirrors to pass to the imager along a pair of outer subfields of the field of view of the imager, the central subfield being located between the outer subfields.

8. The workstation of claim 7, wherein the overhead mirror portions are a pair of generally planar, fold mirrors.

9. The workstation of claim 7, wherein the side fold mirrors include a pair of first side mirrors that face the overhead mirror portions, and a pair of second side mirrors that face the first side mirrors.

10. The workstation of claim 7, wherein the overhead mirror portions and the side fold mirrors are symmetrically positioned relative to the vertical axis.

11. The workstation of claim 7, wherein the overhead mirror portions and the side fold mirrors are oriented relative to one another to reflect the return light along non-skewed optical paths.

12. The workstation of claim 7, and an illumination light source for illuminating each subfield of view.

* * * * *